United States Patent
Iotti

(10) Patent No.: US 12,043,100 B2
(45) Date of Patent: Jul. 23, 2024

(54) TELEHANDLER WITH IMPROVED STABILISERS

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 653 days.

(21) Appl. No.: 16/928,205

(22) Filed: Jul. 14, 2020

(65) Prior Publication Data
US 2021/0016648 A1 Jan. 21, 2021

(30) Foreign Application Priority Data
Jul. 18, 2019 (IT) .......................... 102019000012297

(51) Int. Cl.
| | |
|---|---|
| B60K 1/04 | (2019.01) |
| B60K 17/04 | (2006.01) |
| B66F 9/065 | (2006.01) |
| B66F 9/075 | (2006.01) |
| B66F 9/24 | (2006.01) |
| G05D 1/00 | (2024.01) |

(52) U.S. Cl.
CPC .............. *B60K 1/04* (2013.01); *B60K 17/043* (2013.01); *B66F 9/0655* (2013.01); *B66F 9/07559* (2013.01); *B66F 9/07581* (2013.01); *B66F 9/24* (2013.01); *G05D 1/0016* (2013.01); *G05D 1/0094* (2013.01)

(58) Field of Classification Search
CPC ............. B66F 9/07559; B66F 9/07581; B66F 9/0655; B66F 9/24; B60K 17/043; G05D 1/0016; G05D 1/0094
See application file for complete search history.

(56) References Cited

U.S. PATENT DOCUMENTS

| | | | |
|---|---|---|---|
| 7,671,547 | B2 | 3/2010 | Addleman |
| 9,834,423 | B2 | 12/2017 | Magni |
| 2007/0089925 | A1 | 4/2007 | Addleman |
| 2016/0039648 | A1 | 2/2016 | Magni |

(Continued)

FOREIGN PATENT DOCUMENTS

| | | |
|---|---|---|
| EP | 3031769 B1 | 8/2017 |
| WO | 2008045897 A1 | 4/2008 |

(Continued)

OTHER PUBLICATIONS

European Search Report issued Mar. 22, 2021.

*Primary Examiner* — James A Shriver, II
*Assistant Examiner* — Nicholas R. Kandas
(74) *Attorney, Agent, or Firm* — Pearne & Gordon LLP; J. Gregory Chrisman

(57) ABSTRACT

Described is a stabiliser (1) for a telehandler, comprising a supporting frame (11) designed to be mounted on the carriage (2) of a telehandler (1) and two telescopic arms (12, 13) fixed to the frame (11), each of which includes a first hollow segment (121, 131) directly connected to the frame (11) and a second hollow segment (122, 132) inserted in a slidable fashion in the first segment (121, 131).
A pull-out linear actuator (18) of the electric type is positioned inside each arm (12, 13) and has one end fixed to the first segment (121, 131) and one end fixed to the second segment (122, 132).

10 Claims, 4 Drawing Sheets

(56) References Cited

U.S. PATENT DOCUMENTS

2019/0270624 A1    9/2019  Sembo
2020/0346556 A1*  11/2020  Rocholl

FOREIGN PATENT DOCUMENTS

| WO | WO2008/045897 A1 | * | 4/2008 |
| WO | 2010028649 A1 | | 3/2010 |
| WO | WO2011128772 A1 | * | 4/2010 |
| WO | WO 2014/135169 | * | 3/2013 |
| WO | WO-2014/135169 | * | 3/2013 |
| WO | 2014162191 A1 | | 10/2014 |
| WO | 2018074532 | | 4/2018 |

* cited by examiner

TELEHANDLER WITH IMPROVED STABILISERS

This invention relates to stabilisers for telehandlers actuated at least partly electrically.

More in detail, the invention is designed to be used both in electrical telehandlers, that is to say, with hybrid power supply and "full electric", that is, fully electrical, and in internal combustion telehandlers, in particular diesel.

There are prior art telescopic handlers ("telehandlers") consisting of a vehicle equipped with a movable frame on wheels, a driver's cab and an operating arm which can be extended telescopically.

At the distal end of the arm there is an apparatus for lifting and/or moving loads, such as, for example, a fork, a cage, a lateral transfer unit, a hoist, etc.

Traditionally, the telehandlers are equipped with an internal combustion engine, of the diesel type, which drives a hydrostatic pump which controls a pump for driving the hydraulic distributor, which in turn drives the cylinders which produce the movements both of the arm and of the stabilisers.

Recently, in order to reduce energy consumption and improve environmental sustainability, hybrid electro-hydraulic telehandlers have been developed, which, however, only partially deal with the limits of efficiency, noise and pollution which affect the traditional telehandlers and the other work vehicles.

In this context, the technical purpose which forms the basis of the invention is to provide electrical stabilisers, especially designed for use with an electric telehandler, in order to overcome the limitations of the prior art.

The technical purpose specified is achieved by the stabilisers made according to claim 1.

Further features and advantages of the present invention are more apparent in the non-limiting description of a preferred embodiment of the proposed stabilisers, as illustrated in the accompanying drawings, in which.

Figure 1:
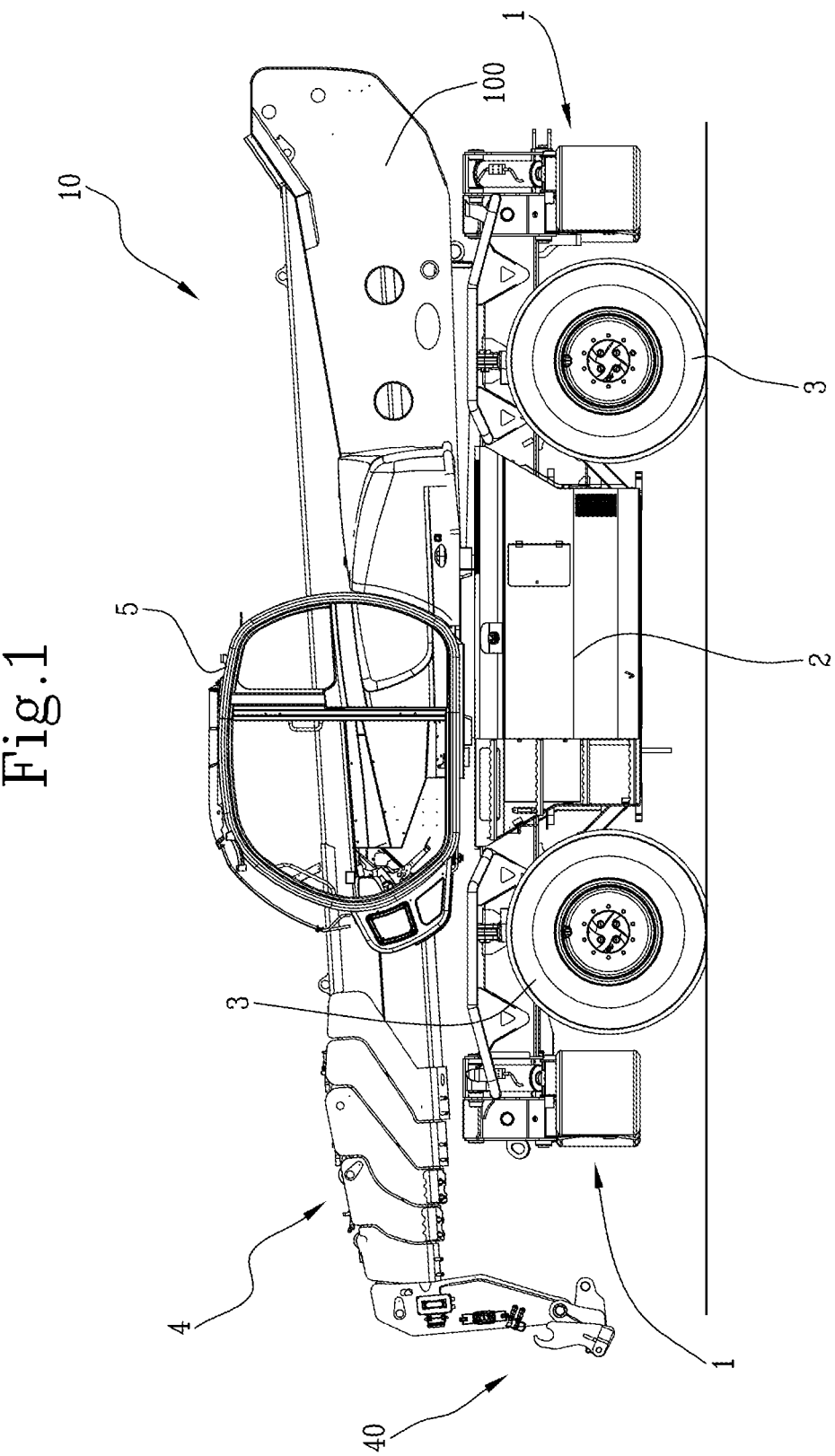
FIG. 1 is a side view of a telehandler to which the invention is intended.

With reference to the accompanying drawings, the numeral 1 denotes in its entirety electrical stabilisers according to the invention.

More in detail, the invention has been designed especially but not exclusively for the application to electrical telehandlers 10, that is to say, "full-electric" or hybrid; this does not mean that the proposed stabilisers cannot also be fitted on telehandlers with "classic" drive, that is to say, diesel or in any case an internal combustion engine.

Moreover, the telehandler 10 on which the invention is intended to be installed may be both fixed and rotary and, in the second case, it is equipped with a rotary tower 100.

The telehandler 10 includes a carriage 2 movable on four drive wheels 3 and a lifting arm 4, hinged to the carriage 2 or to the tower 100, which can be lifted and extended telescopically using suitable hydraulic actuators, in particular hydraulic cylinders.

Moreover, at its distal end, the arm 4 is provided with a coupling device 40 which allows the apparatus to be hooked up and replaced, which can in turn be equipped with a hydraulic actuator.

The hydraulic actuators present in the telehandler 10 are controlled by a hydraulic distributor, mounted on board the vehicle, which is actuated by a hydraulic pump.

Moreover, the telehandler 10 may be equipped with a cab 5 or be without a cab and therefore only be controlled by a remote control system.

In both cases, a control unit controls both the operation of the electric motor (or motors) and that of the hydraulic distributor, on the basis of the commands actuated by the operator.

The stabilisers 1 are mounted in pairs at the opposite longitudinal ends of the carriage 2, that is to say, at the front and at the rear (see FIG. 1).

More in detail, each pair of stabilisers 1 according to the invention includes a supporting frame 11 directly fixed or welded to the carriage 2 and two telescopic arms 12, 13 fixed to said frame 11, each of which includes a first hollow segment 121, 131 directly connected to the frame 11 and a second hollow segment 122, 132 inserted in a slidable fashion in the first segment, to define a pull-out element, equipped with a foot 14, 15 or support base at the distal end.

It should be noted that the invention is not limited to the use of a single pull-out element for the arm, as several pull-out elements can be used.

In the example illustrated, the stabilisers 1 are of the scissor or "X" type, and therefore have the arms 12, 13 which cross each other; in this case, their descent and opening movements to lift the carriage 2 from the ground, in such a way that the wheels 3 are spaced from the ground, for the purposes of stabilising, as well as the return and closing movements, for picking up the stabilisers 1 in the configuration of minimum dimensions, can also be as in traditional scissor-like stabilisers.

The first segments 121, 131 of the arms 12, 13 are rotationally connected to the frame 11 and there are two rotation actuators 16, 17 which allow the oscillation.

More in detail, the rotation actuators 16, 17 are hinged at a first end to the frame 11 and at an opposite end to a respective first segment 121, 131.

Figure 4:
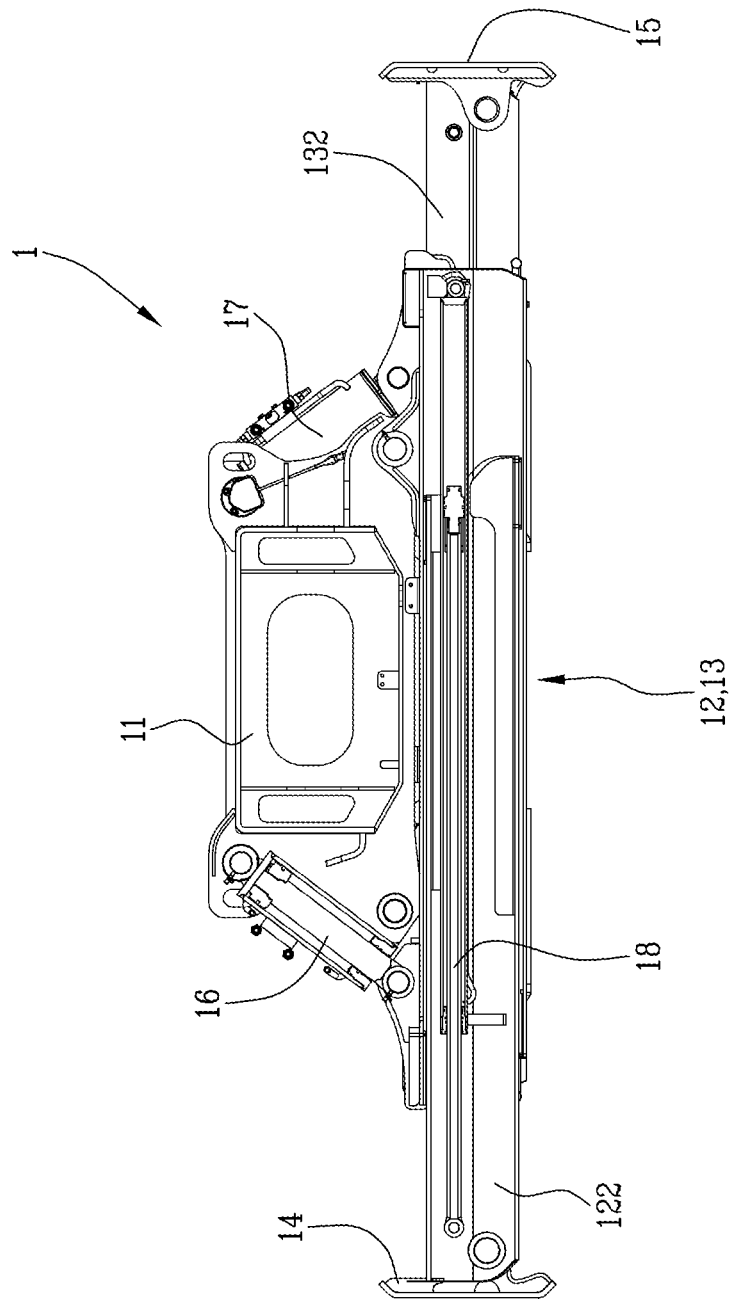
FIG. 4 is a front cutaway view of the stabilisers of the two previous drawings.

The elongation of each arm 12, 13 is obtained by means of a sliding actuator of the electric type 18 (shown only in FIG. 4), positioned inside the arm 12, 13 and having one end fixed to the first segment 121, 131 and one end fixed to the second segment 122, 132.

Figure 2:
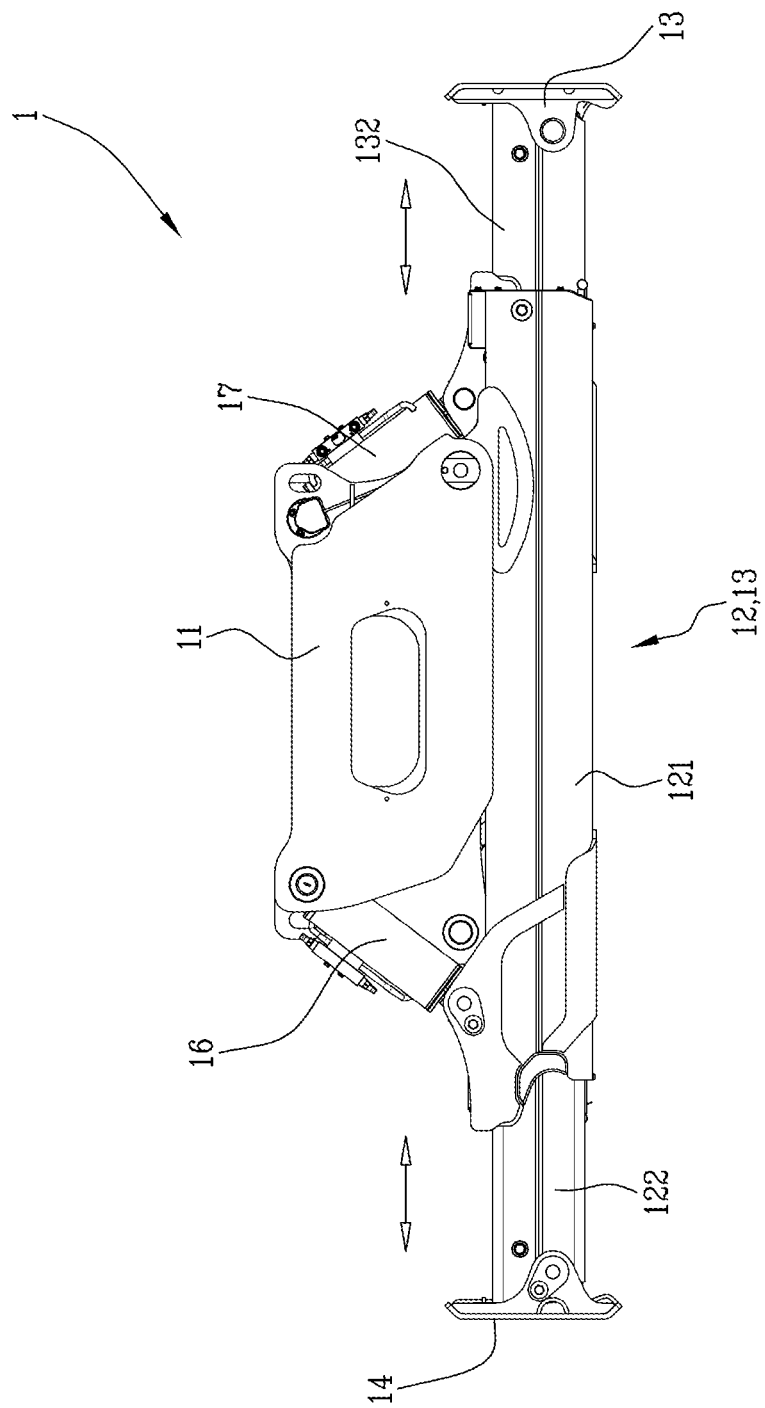
FIGS. 2 and 3 are front views of the stabilisers according to the invention in two different operating positions.

Therefore, whilst the rotation actuators 16, 17 can be both of the hydraulic type (therefore hydraulic cylinders) and of the electric type, the sliding actuators 18 according to the invention are necessarily of the electrical type and are subject to the command of the control unit configured for generating extension signals designed to adjust the draw-out of the stabilising arms 12, 13 (shown by the arrows in FIG. 2).

If there are several pull-out elements for each arm, they may also be actuated by a plurality of linear electric actuators.

The use of electric actuators for actuating the arms is particularly suited, even if not necessarily, with the implementation of the invention on an electric telehandler 10, which comprises one or more drive apparatuses connected to the four drive wheels 3, an electric motor connected directly to the drive apparatuses and at least one battery or battery pack designed to power the motor.

More precisely, a transmission without hydraulic components may be defined between the electric motor and the drive wheels.

It should be noted that the control unit can include a memory module where a lowering sequence of the stabilisers 1 and a recovery sequence of the stabilisers is recorded and a control module of the stabilisers configured to control the hydraulic distributor and the electric draw-out actuators to automatically perform said sequences.

Figure 3:
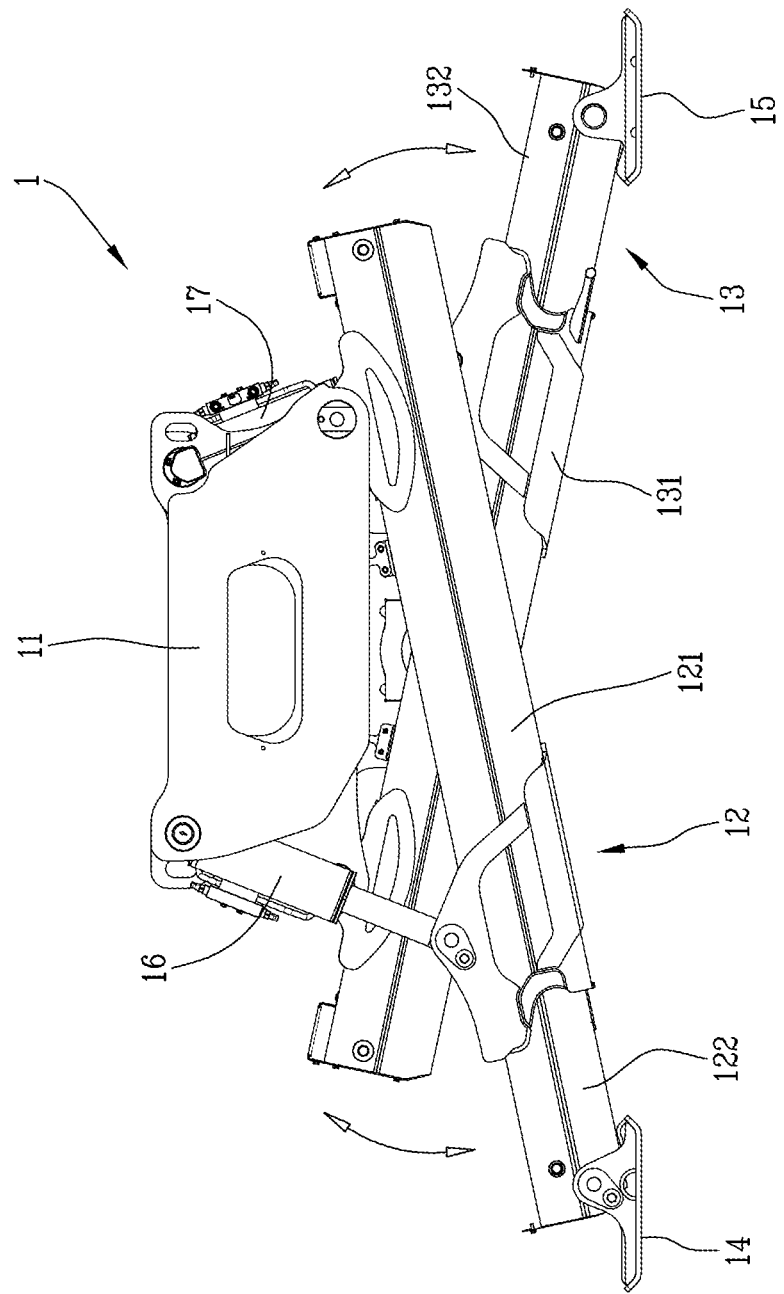

More specifically, the control module is designed to produce rotation signals that are directed to the distributor for actuating the rotation actuators of the arms 16, 17 (see FIG. 3) or extension signals for actuating the sliding actuators 18; if the rotation actuators are of the electric type, they would receive the electrical rotation signals of the arms directly from the control module.

The invention claimed is:

1. A stabiliser (1) for a telehandler, the stabiliser (1) comprising:
   a supporting frame (11) designed to be mounted on a carriage (2) of the telehandler and two telescopic arms (12, 13) fixed to said frame (11), and
   wherein each arm includes;
   a first hollow segment (121, 131) directly connected to the frame (11),
   a second hollow segment (122, 132) inserted in a slidable fashion in the first segment (121, 131) and
   at least one sliding actuator (18) of the electric type positioned inside the arm (12, 13),
   wherein an end of the sliding actuator (18) is fixed to the first segment (121, 131) and an other end of the sliding actuator (18) is fixed to the second segment (122, 132), the sliding actuator (18) of the electric type is powered by at least one battery or battery pack,
   wherein the electronic control unit comprises a memory module and a control module,
   wherein the memory module records a lowering sequence of the stabiliser (1) and/or a recovery sequence of the stabiliser (1), and
   wherein the control module is configured to produce extension signals for actuating the at least one sliding actuator (18) to perform said recorded sequences.

2. The stabiliser (1) according to claim 1, wherein the first segments (121, 131) of the arms are connected in a rotational fashion to the frame (11), two rotation linear actuators (16, 17) being hinged at a respective first end to the frame (11) and at an opposite end to a respective first segment (121, 131), to allow an oscillation.

3. The stabiliser according to claim 2, wherein said rotation linear actuators (16, 17) are of the hydraulic type.

4. The stabiliser according to claim 1, wherein each arm is telescopic and includes more than two segments slidably inserted inside each other, to define at least two sliding elements.

5. An electric telehandler (10) comprising a carriage (2) movable on drive wheels (3), one or more traction apparatuses connected to the drive wheels (3), and an electric motor connected directly to said traction apparatuses; wherein the least one battery or battery pack is designed to power the motor and two stabilisers (1) according to claim 1, the two stabilisers (1) being positioned at longitudinal ends of the carriage (2).

6. The telehandler (10) according to claim 5, wherein between the electric motor and the drive wheels (3) there is a transmission without hydraulic components.

7. The telehandler (10) according to claim 5, comprising an electro-hydraulic distributor to supply rotation actuators (16, 17).

8. The telehandler (10) according to claim 5, which can be operated manually and comprising the electronic control unit designed for receiving control signals from a remote control and for regulating the operation of the motor and the stabilisers (1) in accordance with the control signals received.

9. The stabiliser (1) according to claim 1, wherein the memory module includes the recovery sequence of the stabiliser (1) and the lowering sequence of the stabiliser (1).

10. The stabiliser according to claim 1, wherein the control module produces rotation signals of the arms directed to a distributor for actuating two rotation linear actuators (16, 17) being hinged at a respective first end to the frame (11) and at an opposite end to a respective first segment (121, 131).

* * * * *